(12) United States Patent
Goodman et al.

(10) Patent No.: US 12,347,852 B2
(45) Date of Patent: Jul. 1, 2025

(54) ZINC ALLOY ELECTRODES FOR LITHIUM BATTERIES

(71) Applicant: Li-Metal Corp., Markham (CA)

(72) Inventors: Jonathan T. Goodman, Evanston, IL (US); Yong Shi, Oakville (CA)

(73) Assignee: Li-Metal Corp., Markham (CA)

( * ) Notice: Subject to any disclaimer, the term of this patent is extended or adjusted under 35 U.S.C. 154(b) by 0 days.

(21) Appl. No.: 18/183,417

(22) Filed: Mar. 14, 2023

(65) Prior Publication Data

US 2024/0186496 A1    Jun. 6, 2024

Related U.S. Application Data

(60) Provisional application No. 63/429,435, filed on Dec. 1, 2022.

(51) Int. Cl.
| | |
|---|---|
| H01M 4/38 | (2006.01) |
| H01M 4/04 | (2006.01) |
| H01M 4/134 | (2010.01) |
| H01M 4/1395 | (2010.01) |
| H01M 4/66 | (2006.01) |
| H01M 4/02 | (2006.01) |

(52) U.S. Cl.
CPC ......... *H01M 4/382* (2013.01); *H01M 4/0404* (2013.01); *H01M 4/0421* (2013.01); *H01M 4/0471* (2013.01); *H01M 4/134* (2013.01); *H01M 4/1395* (2013.01); *H01M 4/661* (2013.01); *H01M 4/662* (2013.01); *H01M 4/667* (2013.01); *H01M 4/668* (2013.01); *H01M 2004/027* (2013.01)

(58) Field of Classification Search
CPC ...... H01M 4/382; H01M 4/134; H01M 4/667; H01M 4/662; H01M 4/661; H01M 4/668; H01M 2004/027
See application file for complete search history.

(56) References Cited

U.S. PATENT DOCUMENTS

| | | |
|---|---|---|
| 5,053,297 A | 10/1991 | Yamahira |
| 5,067,990 A | 11/1991 | Ribitch |
| 5,080,932 A | 1/1992 | Koksbang |
| 5,518,839 A | 5/1996 | Olsen |

(Continued)

FOREIGN PATENT DOCUMENTS

| | | |
|---|---|---|
| CN | 109742323 | 3/2018 |
| CN | 109390548 | 2/2019 |

(Continued)

OTHER PUBLICATIONS

Itoh, Satoshi et al. (1977). Electrocrystallization of various metals onto copper single crystal substrates. Surface Technology, 5(1), 27-42.

(Continued)

*Primary Examiner* — Laura Weiner

(57) ABSTRACT

Zinc containing electrodes and anodes, processes for their production, and cells including said electrodes and anodes are disclosed. The electrodes and anodes can include zinc adjacent to a copper current collector and carrying lithium metal. Processes include the deposition of zinc and then lithium onto the current collector and the electrochemical products include the electrodes and anodes in a lithium-metal cell.

5 Claims, 14 Drawing Sheets

(56) References Cited

U.S. PATENT DOCUMENTS

| | | | |
|---|---|---|---|
| 5,522,955 A | 6/1996 | Brodd | |
| 5,846,675 A | 12/1998 | Sazhin | |
| 6,025,094 A | 2/2000 | Visco | |
| 6,214,061 B1 | 4/2001 | Visco | |
| 6,402,795 B1 | 6/2002 | Chu | |
| 6,430,031 B1 | 8/2002 | Dispennette | |
| 6,713,216 B2 | 3/2004 | Kugai | |
| 6,844,113 B2* | 1/2005 | Yagi | H01M 4/661 |
| | | | 429/231.95 |
| 6,991,662 B2 | 1/2006 | Visco | |
| 7,390,591 B2 | 6/2008 | Visco | |
| 7,811,705 B2 | 10/2010 | Scott | |
| 8,133,374 B2 | 3/2012 | Takezawa | |
| 8,221,915 B2 | 7/2012 | Tikhonov | |
| 8,282,806 B2 | 10/2012 | Fuhrmann | |
| 8,821,969 B2 | 9/2014 | He | |
| 9,315,680 B2 | 4/2016 | Uemura | |
| 9,418,796 B2 | 8/2016 | Yoshimura | |
| 10,177,366 B2 | 1/2019 | Swonger | |
| 10,541,406 B1 | 1/2020 | Teeters | |
| 10,593,988 B2 | 3/2020 | Xiao | |
| 10,862,129 B2 | 12/2020 | Pan | |
| 10,862,171 B2 | 12/2020 | Visco | |
| 11,214,882 B2 | 1/2022 | Kaczmarek et al. | |
| 2002/0177044 A1 | 11/2002 | Yagi | |
| 2004/0219432 A1 | 11/2004 | Kojima | |
| 2006/0019168 A1 | 1/2006 | Li | |
| 2006/0137168 A1 | 6/2006 | Futscher | |
| 2010/0266898 A1 | 10/2010 | Yamamoto | |
| 2011/0177398 A1 | 7/2011 | Affinito | |
| 2011/0300290 A1 | 12/2011 | Kim | |
| 2013/0095380 A1 | 4/2013 | Affinito | |
| 2014/0011072 A1 | 1/2014 | Leuthner | |
| 2014/0015453 A1 | 1/2014 | Leuthner | |
| 2016/0181594 A1 | 6/2016 | Balogh | |
| 2016/0233549 A1 | 8/2016 | Tiruvannamalai | |
| 2017/0263935 A1 | 9/2017 | Kozen | |
| 2017/0365854 A1 | 12/2017 | Gopalakrishnannair | |
| 2017/0373321 A1 | 12/2017 | Skotheim | |
| 2018/0005767 A1 | 1/2018 | Divigalpitiya | |
| 2018/0371632 A1 | 12/2018 | Bodoin | |
| 2019/0013516 A1 | 1/2019 | Herle | |
| 2019/0048483 A1 | 2/2019 | Swonger | |
| 2019/0058198 A1 | 2/2019 | Fan | |
| 2019/0088987 A1 | 3/2019 | Herle | |
| 2019/0140267 A1 | 5/2019 | Gopalakrishnan Nair | |
| 2019/0173090 A1 | 6/2019 | Liang | |
| 2019/0190000 A1 | 6/2019 | Herle | |
| 2019/0379056 A1 | 12/2019 | Chen | |
| 2020/0127293 A1 | 4/2020 | Son | |
| 2020/0194786 A1 | 6/2020 | Wang | |
| 2020/0280104 A1 | 9/2020 | Son | |
| 2021/0194058 A1 | 6/2021 | Sekiya | |
| 2022/0216482 A1 | 7/2022 | Jastrzebski | |
| 2022/0328803 A1 | 10/2022 | Herle | |
| 2024/0243264 A1 | 7/2024 | Jastrzebski | |

FOREIGN PATENT DOCUMENTS

| | | |
|---|---|---|
| CN | 109727779 | 5/2019 |
| CN | 20200280104 | 5/2019 |
| EP | 0690517 | 1/1996 |
| JP | 1987053569 | 4/1987 |
| JP | H04206275 | 7/1992 |
| JP | H09298066 | 11/1997 |
| JP | 2797390 | 9/1998 |
| JP | 2002203593 | 7/2002 |
| JP | 2005063978 | 3/2005 |
| JP | 2011089160 | 5/2011 |
| JP | 2011258913 | 12/2011 |
| JP | 2012059484 | 3/2012 |
| JP | 2020530183 | 10/2020 |
| KR | 20100127983 | 12/2010 |
| WO | 2005001157 | 1/2005 |
| WO | 2012076328 | 6/2012 |
| WO | 2017138361 | 8/2017 |
| WO | 2017196892 | 11/2017 |
| WO | 2018193993 | 10/2018 |
| WO | 2019246095 A1 | 12/2019 |
| WO | 2020210913 | 10/2020 |
| WO | 2021080052 | 4/2021 |
| WO | 2022077120 | 4/2022 |
| WO | 2022241538 | 11/2022 |

OTHER PUBLICATIONS

Popov, K. I., Keca, D. N., &; Andjelic, M. D. (1978). Electrodeposition of zinc on copper from alkaline zincate solutions. Journal of Applied Electrochemistry, 8(1), 19-23.

Chu, M. G., McBreen, J., &; Adzic, G. (1981). Substrate effects on zinc deposition from zincate solutions: I. deposition on Cu, Au, CD and Zn. Journal of The Electrochemical Society, 128(11), 2281-2286.

Grier, D., Ben-Jacob, E., Clarke, R., &; Sander, L. M. (1986). Morphology and microstructure in electrochemical deposition of zinc. Physical Review Letters, 56(12), 1264-1267.

Kadlec, S., &; Musil, J. (1996). Low pressure magnetron sputtering and selfsputtering discharges. Vacuum, 47(3), 307-311.

Nakamura, I., Fujitani, T., Uchijima, T., &; Nakamura, J. (1996). A model catalyst for Methanol Synthesis: Zn-deposited and Zn-free Cu Surfaces. Journal of Vacuum Science Technology A: Vacuum, Surfaces, and Films, 14(3), 1464-1468.

Chaliampalias, D., Papazoglou, M., Tsipas, S., Pavlidou, E., Skolianos, S., Stergioudis, G., &; Vourlias, G. (2011). Fabrication and examination of oxidation resistance of zinc coated copper and brass components by chemical deposition. Surface Engineering, 27(5), 362-367.

Okamoto, H. (2012). Li—Zn (lithium-zinc). Journal of Phase Equilibria and Diffusion, 33(4), 345-345.

Fahlteich, John, Amberg-Schwab, Sabine., Weber, Ulrike., Noller, Klaus., Miesbauer, Oliver., Boeffel, Christine., &; Schiller, Nicolas. (2013). 29.1: Ultra-high barriers for encapsulation of flexible displays and lighting devices. SID Symposium Digest of Technical Papers, 44(1), 354-357.

Cazzaniga, Andrea., Ettlinger, Rebecca Bolt., Canulescu, Stela., Schou, Jørge. N., &; Pryds, Nini. (2014). Nanosecond laser ablation and deposition of silver, copper, zinc and tin. Applied Physics A, 117(1), 89-92.

Yan, Z., Wang, E., Jiang, L., &; Sun, G. (2015). Superior cycling stability and high rate capability of three-dimensional Zn/CU foam electrodes for zinc-based alkaline batteries. RSC Advances, 5(102), 83781-83787.

Bhaskar, Srilakshmi. P., &; Jagirdar, Balajir. (2017). A journey from bulk brass to nanobrass: A comprehensive study showing structural evolution of various Cu/Zn bimetallic nanophases from the vaporization of brass. Journal of Alloys and Compounds, 694, 581-595.

Mueller, Franziska., Geiger, Dorin., Kaiser, Ute., Passerini, Stefano., &; Bresser, Dominic. (2016). Elucidating the impact of cobalt doping on the lithium storage mechanism in conversion/alloying-type zinc oxide anodes. ChemElectroChem, 3(9), 1311-1319.

Muench, Simon., Wild, Andreas., Friebe, Christian., Haupler, Bernhard., Janoschka, Tobias., Schubert, Ulrich S. (2016). Polymer-based organic batteries. Chemical Reviews, 116(16), 9438-9484.

Fahlteich, John., Steiner, Cindy., Schiller, Nicolas., Miesbauer, Oliver., Noller, Klaus., Deichmann, Karl.-Joachim., Mirza, Mark., &; Amberg-Schwab, Sabine. (2017). Roll-to-roll thin film coating on fluoropolymer webs—status, challenges and applications. Surface and Coatings Technology, 314, 160-168.

Yan, Kai., Lu, Zhenda., Lee, H. Yun.-Wook., Xiong, Feng., Hsu, Po.-Chun., Li, Yuzhang., Zhao, Jie., Chu, Steven., &; Cui, Yi. (2016). Selective deposition and stable encapsulation of lithium through heterogeneous seeded growth. Nature Energy, 1(3).

Liu, S., Zhang, X., Li, R., Gao, L., &; Luo, J. (2018). Dendrite-free li metal anode by lowering deposition interface energy with CU99ZN alloy coating. Energy Storage Materials, 14, 143-148.

Genovese, Matthew., Louli, A. J., Weber, Rochelle., Sanderson, R. J., Johnson, M. B., &; Dahn, J. R. (2018). Combinatorial methods

(56) References Cited

OTHER PUBLICATIONS for improving lithium metal cycling efficiency. Journal of The Electrochemical Society, 165(13).

Xu, Kangli., Zhu, Maogen., Wu, Xun., Liang, Jianwen., Liu, Yun., Zhang, Tianwen., Zhu, Yongchun., &; Qian, Y. (2019). Dendrite-tamed deposition kinetics using single-atom zn sites for Li Metal anode. Energy Storage Materials, 23, 587-593.

Wang, Gang., Xiong, X., Zou, P., Fu, X., Lin, Z., Li, Y., Liu, Y., Yang, C., &; Liu, M. (2019). Lithiated zinc oxide hanorod arrays on copper current collectors for robust Li metal anodes. Chemical Engineering Journal, 378, 122243.

Zhang, N., Yu, S.-H., &; Abruna, H. D. (2019). Regulating lithium nucleation and growth by zinc modified current collectors. Nano Research, 13(1), 45-51.

Qian, Y., Meng, C., He, J., &; Dong, X. (2020). A lightweight 3D zn@cu nanosheets@activated carbon cloth as long-life anode with large capacity for flexible zinc ion batteries. Journal of Power Sources, 480, 228871.

Lu, S., Wang, Z., Yan, H., Wang, R., Lu, K., Cheng, Y., Qin, W., &; Wu, X. (2020). High rate and cycling stable Li metal anodes enabled with aluminum-zinc oxides modified copper foam. Journal of Energy Chemistry, 41, 87-92.

Li, Z., Shi, Z.-Z., Hao, Y., Li, H.-F., Zhang, H.-J., Liu, X.-F., &; Wang, L.-N. (2020). Insight into role and mechanism of Li on the key aspects of biodegradable Zn Li alloys: Microstructure Evolution, mechanical properties, corrosion behavior and cytotoxicity. Materials Science and Engineering: C, 114, 111049.

Zhang, D., Dai, A., Wu, M., Shen, K., Xiao, T., Hou, G., Lu, J., &; Tang, Y. (2019). Lithiophilic 3D porous CuZn current collector for stable lithium metal batteries. ACS Energy Letters, 5(1), 180-186.

Chi, S.-S., Wang, Q., Han, B., Luo, C., Jiang, Y., Wang, J., Wang, C., Yu, Y., &; Deng, Y. (2020). Lithiophilic zn sites in porous CuZn alloy induced uniform li nucleation and dendrite-free li metal deposition. Nano Letters, 20(4), 2724-2732.

Zhou, B., Bonakdarpour, A., Stosevski, I., Fang, B., &; Wilkinson, D. P. (2022). Modification of cu current collectors for Lithium Metal Batteries—A Review. Progress in Materials Science, 130, 100996.

Zheng Z. J., Ye, H., &; Guo, Z. P. (2020). Recent progress in designing stable composite lithium anodes with mproved wettability. Advanced Science, 7(22), 2002212.

Yamada, M., Watanabe, T., Gunji, T., Wu, J., &; Matsumoto, F. (2020). Review of the design of current collectors for improving the battery performance in lithium-ion and Post-Lithium-Ion Batteries. Electrochem, 1(2), 124-159.

Fayette, M., Chang, H. J., Rodriguez-Perez Ismael A., Li, X., &; Reed, D. (2020). Electrodeposited zinc-based films as anodes for aqueous zinc batteries. ACS Applied Materials &; Interfaces, 12(38), 42763-42772.

Zhu, P., Gastol, D., Marshall, J., Sommerville, R., Goodship, V., &; Kendrick, E. (2021). A review of current collectors for lithium-ion batteries. Journal of Power Sources, 485, 229321.

Chen, Q., Li, H., Meyerson, M. L., Rodriguez, R., Kawashima, K., Weeks, J. A., Sun, H., Xie, Q., Lin, J., Henkelman, G., Heller, A., Peng, D.-L., &; Mullins, C. B. (2021). Li-zn overlayer to facilitate uniform lithium deposition for lithium metal batteries. ACS Applied Materials Interfaces, 13(8), 9985-9993.

Liu, Y., Gao, D., Xiang, H., Feng, X., &; Yu, Y. (2021). Research progress on copper-based current collector for lithium metal batteries. Energy Fuels, 35(16), 12921-12937.

Li, D., Hu, H., Chen, B., &; Lai, W. Y. (2022). Advanced current collector materials for high-performance lithium metal anodes. Small, 18(24), 2200010.

Yuan, H., Ding, X., Liu, T., Nai, J., Wang, Y., Liu, Y., Liu, C., &; Tao, X. (2022). A review of concepts and contributions in lithium metal anode development. Materials Today, 53, 173-196.

Jeong, H., Jang, J., &; Jo, C. (2022). A review on current collector coating methods for next-generation batteries. Chemical Engineering Journal, 446, 136860.

Joshi, B., Samuel, E., Kim, Y.-Il, Yarin, A. L., Swihart, M. T., &; Yoon, S. S. (2022). Progress and potential of electrospinning-derived substrate-free and binder-free lithium-ion battery electrodes. Chemical Engineering Journal, 430, 132876.

Office Action issued for U.S. Appl. No. 18/055,706 on Mar. 23, 2023.

Fan, Z. et al. (2022) "Long-cycling all-solid-state batteries achieved by 2D interface between prelithiated aluminum foil anode and sulfide electrolyte," Small, 18(44), p. 2204037.

Crowley, P. J., et al. (2022) "Diffusional lithium trapping as a failure mechanism of aluminum foil anodes in lithium-ion batteries," Journal of Power Sources, 546, p. 231973.

Zheng T. et al. (2022) "Aluminum foil anodes for Li-ion rechargeable batteries: The role of Li solubility within β-lial," ACS Sustainable Chemistry Engineering, 10(10), pp. 3203-3210.

Li D. et al. (2022) "Single-material aluminum foil as anodes enabling high-performance lithium-ion batteries: The roles of prelithiation and working mechanism," Materials Today, 58, pp. 80-90.

Final Office Action issued for U.S. Appl. No. 18/055,706 on Jul. 14, 2023.

Pham, M. T. M., et al. (2021) "Prevention of lithium-ion battery thermal runaway using polymer-substrate current collectors" Cell Reports Physical Science, 2(3), 100360. https://doi.org/10.1016/j.xcrp.2021.100360.

Allen, J. (2020). Review of polymers in the prevention of thermal runaway in lithium-ion batteries. Energy Reports, 6, 217-224. https://doi.org/10.1016/j.egyr.2020.03.027.

Choi, B. N., et al. (2020) "Electro-deposition of the lithium metal anode on dendritic copper current collectors for lithium battery application" Applied Surface Science, 506, 144884. https://doi.org/10.1016/j.apsusc.2019.144884.

Fritsch, M., et al. (2020) "Lightweight polymer-carbon composite current collector for lithium-ion batteries", Batteries, 6 (4), 60. https://doi.org/10.3390/batteries6040060.

Cho, E.-C., et al. (2021) "Modification of aluminum current collectors with laser-scribed graphene for enhancing the performance of Lithium Ion Batteries" Journal of Power Sources, 506, 230060. https://doi.org/10.1016/j.jpowsour.2021.230060.

Zhou, Y., Wang, et al. (2019) "Recent advances in fiber-shaped supercapacitors and lithium—Ion Batteries" Advanced Materials, 32(5), 1902779 https://doi.org/10.1002/adma.201902779.

Whitehead, A. H., et al. (2005) "Current collectors for positive electrodes of lithium-based batteries" Journal of The Electrochemical Society, 152(11). https://doi.org/10.1149/1.2039587.

Yun, J. H., et al. (2011) "Low resistance flexible current collector for Lithium Secondary Battery. Electrochemical and Solid-State Letters" 14(8). https://doi.org/10.1149/1.3596721.

Choudhury, R., et al. (2021) "Engineering current collectors for batteries with high specific energy," Joule, 5(6), pp. 1301-1305.

Ye, Y. et al. (2020) "Ultralight and fire-extinguishing current collectors for high-energy and high-safety lithium-ion batteries," Nature Energy, 5(10), pp. 786-793.

Zhang, Y. et al. (2020) "Polyaniline/copper composite anode current collectors prepared through electrochemical polymerization for lithium—Ion Batteries," ChemElectroChem, 7(13), pp. 2896-2904. Available at: https://doi.org/10.1002/celc.202000692.

Chen, L.L. et al. (2020) "Nonmetal current collectors: The key component for high-energy-density aluminum batteries," Advanced Materials, 32(42), p. 2001212. Available at: https://doi.org/10.1002/adma.202001212.

Garcia, A. et al. (2011) "Localized ligand induced electroless plating (LIEP) process for the fabrication of copper patterns onto flexible polymer substrates," Advanced Functional Materials, 21(11), pp. 2096-2102. Available at: https://doi.org/10.1002/adfm.201100041.

Non-final rejection issued for U.S. Appl. No. 18/055,715, mailed Mar. 15, 2023.

Final rejection issued for U.S. Appl. No. 18/055,715, mailed Jun. 28, 2023.

Hongli VVan, Jiaxun Zhang, et al. Salt-in-Salt Reinforced Carbonate Electrolyte for Li Metal Batteries; Sufu Liu+ , Jiale Xia+ , Weiran Zhang+ , ngew. Chem. nt. Ed. 2022, 61, e202210522.

Chen J. et al. (2021) "An Inorganic-Rich Solid Electrolyte Interphase for Advanced Lithium-Metal Batteries in Carbonate Electrolytes"; Sufu Liu+ , Xiao Ji+ , Nan Piao+ , . Chem. Int. Ed. 2021, 60, 3661-3671.

(56) References Cited

OTHER PUBLICATIONS

Ming Liu et al. (2019) "Efficient Li-metal plating/stripping in carbonate electrolytes using a LiNO3-gel polymer electrolyte, monitored by operando neutron depth profiling" Chem. Mater., Just Accepted Manuscript . Publication Date (Web): May 23, 2019, Downloaded from ittp://pubs.acs.org on May 24, 2019.

Weidong Zhang, et al.; (2020) Colossal Granular Lithium Deposits Enabled by the Grain-Coarsening Effect for High-Efficiency Lithium Metal Full Batteries; Adv. Mater., 2001740, DOI: 10.1002/adma.202001740.

Dongdong Liu et al.; An inorganic-rich SEI induced by LiNO3 additive for a stable lithium metal anode in carbonate electrolyte; Chem. Commun., 2021, 57, 9232.

Xinyang Nang et al.; Inhibiting Dendrite Growth via Regulating the Electrified Interface for Fast-Charging Lithium Metal Anode; ACS Cent. Sci. 2021, 7, 20292038.

Chong Yan et al.; Lithium Nitrate Solvation Chemistry in Carbonate Electrolyte Sustains High-Voltage Lithium Metal Batteries; Angew. Chem. Int. Ed. 2018, 57, 1-6, 1https://doi.org/10.1002/anie.201807034.

Aurbach, Doron, et al. "The electrochemical behaviour of 1, 3-dioxolane-LiClO4 solutions-I. Uncontaminated solutions." Electrochimica acta 35.3 (1990): 625-638.

Li, Weiyang, et al. "The synergetic effect of lithium polysulfide and lithium nitrate to prevent lithium dendrite growth." Nature communications 6.1 (2015): 1-8.

Xu, Kang. "Nonaqueous liquid electrolytes for lithium-based rechargeable batteries." Chemical reviews 104.10 (2004): 4303-4418.

Liu, Yayuan, et al. "Solubility-mediated sustained release enabling nitrate additive in carbonate electrolytes for stable lithium metal anode." Nature Communications 1 (2018) 9:3656 | DOI: 10.1038/s41467-018-06077-5.

Shi, Qiuwei, et al. "High-capacity rechargeable batteries based on deeply cyclable lithium metal anodes." Proceedings of the National Academy of Sciences 115.22 (2018): 5676-5680.

Zhang, Weidong, et al. "Colossal granular lithium deposits enabled by the grain-coarsening effect for high-efficiency lithium metal full batteries." Advanced Materials 32.24 (2020): 2001740.

Li, Siyuan, et al. "Synergistic dual-additive electrolyte enables practical lithium-metal batteries." Angewandte Chemie International Edition 59.35 (2020): 14935-14941.

Omenya, Fredrick, et al. "Intrinsic challenges to the electrochemical reversibility of the high energy density copper (II) fluoride cathode material." ACS Applied Energy Materials 2.7 (2019): 5243-5253.

Alexander, G. V., Sreejith, O. V., Indu, M. S., &; Murugan, R. (2020). Interface-compatible and high-cyclability lithiophilic lithium-zinc alloy anodes for garnet-structured solid electrolytes. ACS Applied Energy Materials, 3 (9), 9010-9017.

Office Action (Non-Final Rejection) dated Nov. 27, 2024 for U.S. Appl. No. 17/604,009 (pp. 1-10).

Office Action dated Sep. 10, 2024 for U.S. Appl. No. 18/183,417.

Written Opinion of the International Searching Authority for PCT/CA2022/050589, mailed Jul. 11, 2022.

Touja et al., "An Overview on Protecting Metal Anodes with Alloy-Type Coating". Batteries and Supercops, Mar. 10, 2021 (Oct. 3, 2021), vol. vol. 8, Issue 8, pp. 1252-1266. *Sect. 1 Introduction; Sect. 2.2. Other Coating Techniques*.

International Search Report and Written Opinion for corresponding PCT Application No. PCT/CA2021/051454, issued from the Canadian Intellectual Property Office on Jan. 25, 2022.

European Search Report Issued Oct. 11, 2023 in relation to EP20790420.2.

Supplemental European Search Report Issued Jan. 1, 2024 in relation to EP20790420.2.

European Search Opinion Issued Jan. 1, 2024 in relation to EP20790420.2.

International Search Report and Written Opinion for International application No. PCT/CA2020/050513 issued on Jun. 15, 2020, from the Canadian Intellectual Property Office.

Swisher, R., et al. "Progress in Vacuum Deposited Lithium Metal Anode Structures", Mar. 5, 2001, 18th International Seminar & Exhibit on Primary and Secondary Batteries.

Examination Report issued on May 20, 2024 in Indian application 202127052644.

Office Action dated Jun. 4, 2024 for Japanese Application 2021-560734.

Written opinion of the international searching authority for PCT/CA2021/051454 issued Jan. 25, 2022.

Office action issued re: Chinese Application No. 20208003789739, mailed on Aug. 7, 2024.

Office Action dated Aug. 9, 2024 for Brazilian Application 11 2021 020579-9.

* cited by examiner

ZINC ALLOY ELECTRODES FOR LITHIUM BATTERIES

CROSS-REFERENCE TO RELATED APPLICATION

The present application claims the benefit of priority to U.S. Provisional Application No. 63/429,435 filed Dec. 1, 2022.

FIELD OF THE INVENTION

Embodiments of the present disclosure generally relate to compositions and alloys that enhance lithium metal battery performance.

BACKGROUND

Transformational developments in electrical energy storage are needed. In particular, there are needs for secondary batteries (or secondary batteries assembled in a charged state) made from novel materials that would increase the level of energy storage per unit volume and decrease dead weight while maintaining stable electrode-electrolyte interfaces.

The currently available electric energy storage technologies fall far short of the requirements for efficiently providing electrical energy for transportation vehicles, commercial and residential electrical and heating applications, and even for many electrically powered consumer devices. In particular, electrical storage devices with high energy and power densities are needed to power electric vehicles with performance comparable to that of vehicles powered by petroleum-fueled internal combustion engines.

SUMMARY

A first embodiment is an electrode that includes a copper current collector carrying and metallurgically affixed to a zinc layer; the copper current collector and zinc layered adhered by a brass interlayer that includes a diffusion composition; the zinc layer carrying an electrode surface having a surface composition that is free of copper.

A second embodiment is a cell that includes a cathode that includes a current collector carrying a cathodic composition; an electrolyte; and an electrode that includes a copper current collector carrying and metallurgically affixed to a zinc layer; the copper current collector and zinc layered adhered by a brass interlayer that includes a diffusion concentration; the zinc layer carrying an electrode surface having a surface composition that is free of copper.

A third embodiment is a lithium metal anode that includes a copper current collector carrying and metallurgically affixed to a brass interlayer that includes a diffusion composition of zinc and copper; the brass interlayer carrying a lithium alloy layer that includes a diffusion composition of lithium and zinc; the lithium alloy layer carrying and metallurgically affixed to a lithium metal layer.

A fourth embodiment is a lithium metal anode that includes a copper current collector physiochemically affixed to a lithium metal layer by a ternary interlayer; where the ternary interlayer includes a plurality of discontinuous particulates proximal to a surface of the copper current collector, a zinc to copper ratio of about 1:4 to about 4:1; and lithium.

A fifth embodiment is a cell that includes a cathode that includes a current collector carrying a cathodic composition; an electrolyte; and a lithium metal anode that includes a copper current collector carrying and metallurgically affixed to a brass interlayer that includes a diffusion composition of zinc and copper; the brass interlayer carrying a lithium alloy layer that includes a diffusion composition of lithium and zinc; the lithium alloy layer carrying and metallurgically affixed to a lithium metal layer.

A sixth embodiment is a process of preparing a foil that includes providing a copper current collector; depositing zinc, preferably by a vapor deposition process, onto the copper current collector; forming a brass interlayer; depositing lithium, preferably by a vapor deposition process, adjacent to the zinc; and forming a lithium alloy layer.

BRIEF DESCRIPTION OF THE FIGURES

For a more complete understanding of the disclosure, reference should be made to the following detailed description and accompanying drawing figures wherein.

While specific embodiments are illustrated in the figures, with the understanding that the disclosure is intended to be illustrative, these embodiments are not intended to limit the invention described and illustrated herein.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of "one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

Figure 1:
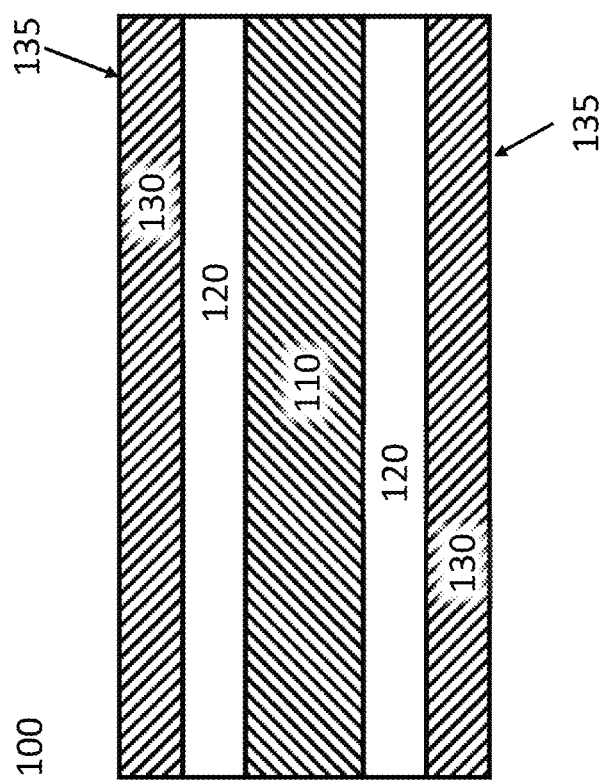
FIG. 1 is a representation of an electrode as described herein.

A first embodiment is an electrode 100 that includes a copper current collector carrying and metallurgically affixed to a zinc layer. For example, as depicted in FIG. 1, the copper current collector 110 and zinc layers 130 are adhered by a brass interlayer 120 that includes a diffusion composition, preferably zinc diffused into copper. The zinc layer, distal from the brass interlayer, carries an electrode surface 135 having a surface composition that is free of copper. That is, while the electrode includes copper and an alloy of zinc and copper as a brass interlayer 120, the surface 135 of the electrode is preferably free of copper, more preferably the surface 135 consists essentially of zinc, or consists of zinc. The surface composition can be determined by a surface analysis technique, for example, EDS or TOF-SIMS.

While a thick copper current collector is applicable to the herein presented invention, a thin copper current collector is preferred. Accordingly, the copper current collector preferably has a thickness of about 4 μm to about 20 μm; about 4 μm to about 15 μm; or about 4 μm to about 10 μm. Herewith, the copper current collector preferably has a current collector composition that includes at least 90 wt. %, 95 wt. %, 97.5 wt. %, 98 wt. %, 99 wt. %, or 99.5 wt. % copper. Notably, the copper current collector can be a cast, rolled, or an electrodeposited copper but the copper current collector is preferably electrodeposited copper.

While zinc can alloy fully with (e.g., diffuse into) the copper thereby providing an electrode that has a brass surface, the copper current collector is that portion of the electrode that has a current collector composition which includes less than 1 wt. %, 0.5 wt. %, 0.25 wt. %, 0.1 wt. %, or 0.05 wt. % zinc. Preferably, the current collector composition consists essentially of copper; more preferably the current collector composition consists of copper; even more preferably the current collector composition is free of zinc.

The zinc layer, carried by the brass interlayer, can have a thickness of about 50 nm to about 5 μm; about 50 nm to about 4 μm; about 50 nm to about 3 μm; about 50 nm to about 2 μm; about 50 nm to about 1 μm; about 100 nm to about 1 μm; or about 250 nm to about 1 μm. While other thicknesses of the zinc layer are possible the layer is preferably sufficiently thick to completely cover the brass interlayer, be pinhole free, and present as a silvery surface (as opposed to a brass/gold colored surface); and preferably sufficiently thin to not adversely affect the flexibility or bending of the electrode. More preferably, the zinc layer has a zinc layer composition that includes at least 90 wt. %, 95 wt. %, 97.5 wt. %, 98 wt. %, 99 wt. %, or 99.5 wt. % zinc.

Similar to the preferred composition of the copper current collector, the zinc layer preferably has little to no copper; that is the electrode preferably has at least three distinct layers/alloy compositions: copper, brass, and zinc where the copper and zinc are sufficiently free of the other to be distinguishable. In another instance, the zinc layer composition includes less than 1 wt. %, 0.5 wt. %, 0.25 wt. %, 0.1 wt. %, or 0.05 wt. % copper. Preferably, the zinc layer composition consists essentially of zinc; more preferably the zinc layer composition consists of zinc; and even more preferably the zinc layer composition is free of copper.

Positioned between the copper and the zinc is the brass interlayer which preferably has a thickness of about 10 nm to about 1 μm; about 10 nm to about 750 nm; about 10 nm to about 500 nm; about 10 nm to about 400 nm; about 10 nm to about 300 nm; about 10 nm to about 250 nm; or about 10 nm to about 200 nm. Notably, the thickness of the brass interlayer can exceed 2 μm but the general preference in the art is for thin, exceedingly thin, electrodes so there is a commercial preference for thinner layers of all types.

While the zinc and copper layers are most preferably free of copper and zinc respectively, the brass interlayer includes both copper and zinc and, preferably, features a diffusion composition of zinc and copper. The diffusion composition can include a zinc concentration that increases from adjacent to the copper current collector to adjacent to the zinc layer and a copper concentration that decreases from adjacent to the copper current collector to adjacent to the zinc layer. Similarly, the zinc concentration preferably decreases from adjacent to the zinc layer to (toward) adjacent to the copper current collector while the copper concentration increases from adjacent to the since layer to (toward) adjacent to the copper current collector. In other examples, the diffusion composition can include distinct zinc/copper ratios, for example, the diffusion composition can include a Cu/Zn atomic ratio from about 4:1 to about 1:30, about 4:1 to about 1:9; about 4:1 to about 1:3; or about 2:3 to about 1:3; the diffusion composition can further include a Cu/Zn atomic ratio of about 3:1, about 1:1, about 2:3, about 1:2, about 1:4, about 1:7, or about 5:8.

The copper current collector can be the core of the electrode, or, in another instance, the electrode can include a polymer core that carries the copper current collector (thereafter carrying the brass interlayer and the zinc layer). The polymer core having a thickness of about 3 μm to about 50 μm; about 3 μm to about 40 μm; about 3 μm to about 30 μm; or about 3 μm to about 25 μm, and can have a composition that includes a polyethylene, a polypropylene, a polyethylene terephthalate, a polyethylene naphthalate, a polyimide, a polyphenylene terephthalamide, a polyaniline, a polypyrrole, a polyacetylene, a polyindole, a polythiophene, a polyphenylene, a poly(p-phenylene vinylene), a polyvinylidene chloride, mixtures, or copolymers thereof. In one example, the polymer core includes a conductive polymer, in another example, the polymer core includes a structural/non-conductive polymer.

Figure 2:
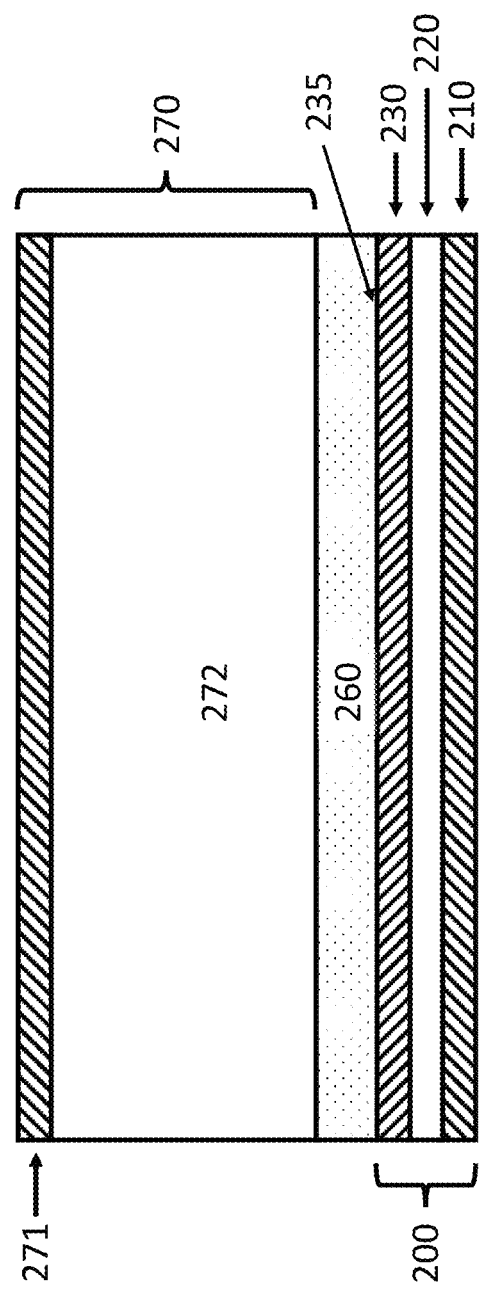
FIG. 2 is a representation of an anode-less cell or couple utilizing the electrode depicted in FIG. 1.

Another embodiment (e.g., FIG. 2) is an electrochemical cell that includes the above-described electrode. In a preferred instance, the cell includes a cathode 270, an electrolyte 260, and an electrode 200. The cathode can include a current collector 271 carrying a cathodic composition 272 and the electrode 200 can include a copper current collector 210 carrying and metallurgically affixed to a zinc layer 230; the copper current collector and zinc layered adhered by a brass interlayer 220 that includes a diffusion concentration; the zinc layer carrying an electrode surface having a surface 235 composition that is free of copper. A preferable electrochemical cell is an 'anodeless' cell where the anodeless cell includes an anodic electrode that is substantially free of, or free of lithium. More preferably, the anodic electrode is free of an anodic composition, for example, free of graphite, silicon, silicon oxide, tin, tin oxide, LTO, or mixtures thereof.

In another instance, the cathode includes a cathodic composition which includes iron, chromium, and/or nickel. The cathodic composition is preferably an oxide, phosphate, or mixture thereof. In one example, the cathodic composition includes a nickel oxide, in another example, the cathodic composition includes an iron phosphate. In another example, the cathodic composition includes one or more of an NMC (NCM)—Lithium Nickel Cobalt Manganese Oxide (e.g., NMC-811, NMC-622, NMC-333), a LFP—Lithium Iron Phosphate, a LMFP—Lithium Manganese Iron Phosphate, a LNMO—Lithium Nickel Manganese Spinel, a NCA—Lithium Nickel Cobalt Aluminum Oxide, a LMO—Lithium Manganese Oxide, and/or a LCO—Lithium Cobalt Oxide. In another example, the cathode material includes a $LiVOPO_4$, a $LiVPO_4F$, and a $Li_3V_2(PO_4)_3$ The cathode can further include one or more conductive additives (e.g., P65, super P, carbon nanotubes or nanowires, graphene nanoplatelets, conductive metals (e.g., silver nanowires), and/or binder (e.g., PVDF). In yet another instance, the cathodic composition includes greater than 50 wt. %, 75 wt. %, 80 wt. %, 85 wt. %, 90 wt. %, or 95 wt. % sulfur. In one example, the sulfur containing cathode composition can further include a graphene. In still another example, the sulfur containing cathode composition can include a binder and/or a conductive additive.

The electrolyte can be a liquid, solid, polymer, or hybrid electrolyte. A preferred example includes a liquid electrolyte. Examples of liquid electrolytes include carbonate-based electrolytes, ether-based electrolytes, or other commercially known electrolytes. Preferably, the liquid electrolytes include a lithium salt, e.g., $LiPF_6$, that supports ionic conductivity through the liquid. In another case, the liquid electrolytes contain a lithium salt, e.g., LiTFSI or LiFSI. In another example, the cell includes a polymer electrolyte, for example a polyethylene oxide material adapted to carry or support ionic conductivity. In still another example, the cell can include a solid electrolyte, for example a sulfide, an argyrodite, a garnet, a perovskite, a phosphate, a phosphorus oxynitride, a thiophosphate, and/or a halide electrolyte as known in the art. Notably, in the examples wherein the electrolyte is a liquid, the cell can further include a separator positioned between the cathode and the electrode. The separator preferably prevents electronic conductivity between the electrode can and cathode but supports ionic conductivity. In instances where the electrolyte is a polymer, solid, or a hybrid, the cell can include a separator but at times the separator is not as critical to the cell design as it is in the liquid systems.

Figure 3:
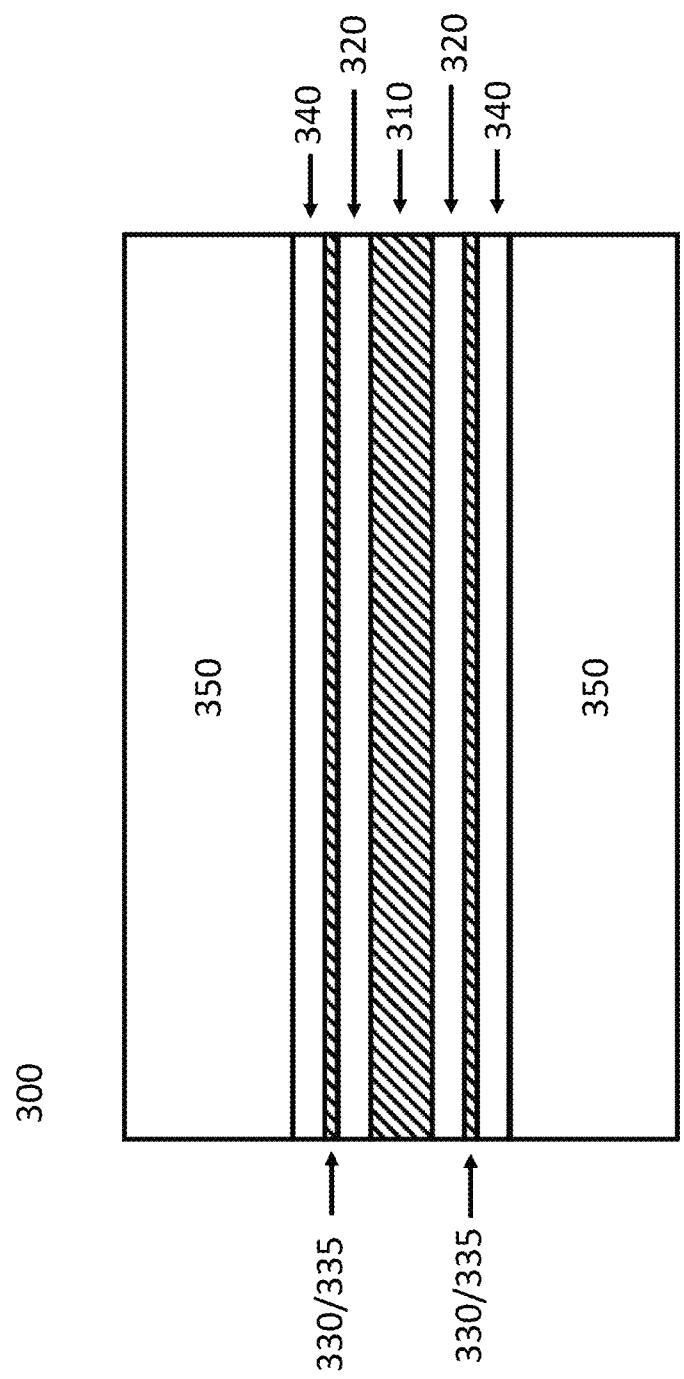
FIG. 3 is one representation of an anode as described herein.

Yet another embodiment (e.g., as shown in FIG. 3) is a lithium metal anode 300 that includes a copper current collector 310 carrying and metallurgically affixed to a brass interlayer 320. The brass interlayer can include a diffusion composition of zinc and copper. The brass interlayer optionally carries a lithium alloy layer 340 that can include a diffusion composition of lithium and zinc. In examples with the lithium alloy layer, this lithium alloy layer carries and is metallurgically affixed to a lithium metal layer 350. In examples without the lithium alloy layer, the brass interlayer 320 carries and is metallurgically affixed to the lithium metal layer 350. In a preferred instance, the lithium metal anode further includes a zinc layer 330 disposed between the brass interlayer and the lithium alloy layer; wherein the zinc layer is substantially free of copper and lithium. In a different instance, the lithium metal anode further includes a ternary interlayer 335 disposed between the brass interlayer 320 and the lithium alloy layer 350, where the ternary interlayer includes lithium, copper, and zinc.

In a preferred instance, the brass interlayer has a thickness of about 0.1 nm to about 1,000 nm, about 0.1 nm to about 500 nm, about 0.1 nm to about 250 nm, about 0.1 nm to about 200 nm, about 0.1 nm to about 150 nm, about 0.1 nm to about 100 nm, about 0.1 nm to about 75 nm, about 0.1 nm to about 50 nm, about 0.1 nm to about 25 nm, about 0.1 nm to about 15 nm, about 0.1 nm to about 10 nm, or about 0.1 nm to about 5 nm; about 10 nm to about 1 μm; about 10 nm to about 750 nm; about 10 nm to about 500 nm; about 10 nm to about 400 nm; about 10 nm to about 300 nm; about 10 nm to about 250 nm; or about 10 nm to about 200 nm. More preferably, the brass interlayer can have a thickness from about 5 nm, about 10 nm, about 15 nm, about 20 nm, about 25 nm, about 30 nm, about 35 nm, about 40 nm, about 45 nm, about 50 nm, about 60 nm, about 70 nm, about 80 nm, about 90 nm, or about 100 nm to about 1,000 nm, 900 nm, 800 nm, 700 nm, 600 nm, 500 nm, 400 nm, 300 nm, 200 nm, 100 nm, or 50 nm. Notably, the brass interlayer thickness can be determined by cross-sectional analysis of the anode, for example, by EDS or TOF-SIMS.

The brass interlayer can further include, consist essentially of, or consist of a diffusion composition that includes, consists essentially of, or consists of zinc and copper, wherein the concentration of zinc and copper change relative to the position within the interlayer and thereby the anode. In one preferable instance, the diffusion composition of zinc and copper includes a zinc concentration that increases from adjacent to the copper current collector toward the lithium alloy layer and a copper concentration that decreases from adjacent to the copper current collector toward the lithium alloy layer. Accordingly, the brass interlayer can have average values for the zinc and the copper concentrations and can have a linear, exponential, or step variation in concentrations relative to the position within the brass interlayer. In one example, the zinc concentration varies from about 1 at. % zinc adjacent to the copper current collector to about 99 at. % distal from the copper current collector and preferably adjacent to the zinc layer. In another example, the zinc concentration in the brass interlayer varies from about 1 at. % to about 99 at. %, 95 at. %, 90 at. %, 85 at. %, 80 at. %, 75 at. %, 70 at. %, 65 at. %, 60 at. %, 55 at. %, or 50 at. %. Notably, in instances wherein the brass interlayer is adjacent to the zinc layer the zinc concentration preferably increases to about 99 at. % zinc, and wherein the brass interlayer is adjacent to a ternary interlayer the zinc concentration may not increase to greater than 95 at. % zinc. Preferably, the brass interlayer is a solid solution of zinc and copper.

The lithium alloy layer, an admixture of at least zinc and lithium, can have a thickness of about 0.1 nm to about 1,000 nm, about 0.1 nm to about 500 nm, about 0.1 nm to about 250 nm, about 0.1 nm to about 200 nm, about 0.1 nm to about 150 nm, about 0.1 nm to about 100 nm, about 0.1 nm to about 75 nm, about 0.1 nm to about 50 nm, about 0.1 nm to about 25 nm, about 0.1 nm to about 15 nm, about 0.1 nm to about 10 nm, or about 0.1 nm to about 5 nm; about 10 nm to about 1 μm; about 10 nm to about 750 nm; about 10 nm to about 500 nm; about 10 nm to about 400 nm; about 10 nm to about 300 nm; about 10 nm to about 250 nm; or about 10 nm to about 200 nm. More preferably, the lithium alloy layer can have a thickness from about 5 nm, about 10 nm, about 15 nm, about 20 nm, about 25 nm, about 30 nm, about 35 nm, about 40 nm, about 45 nm, about 50 nm, about 60 nm, about 70 nm, about 80 nm, about 90 nm, or about 100 nm to about 1,000 nm, 900 nm, 800 nm, 700 nm, 600 nm, 500 nm, 400 nm, 300 nm, 200 nm, 100 nm, or 50 nm. Notably, the brass thickness can be determined by cross-sectional analysis of the anode, for example, by TOF-SIMS or Auger spectroscopy.

The lithium alloy layer includes, consists essentially of, or consists of a diffusion composition that includes, consists essentially of, or consists of includes lithium and zinc and, preferably, includes about 8 to about 92 at. % lithium, about 10 to about 90 at. % lithium, about 20 to about 80 at. % lithium, about 30 to about 70 at. % lithium, or about 40 to about 60 at. % lithium. The lithium alloy layer can further include about 8 to about 92 at. % zinc, about 10 to about 90 at. % zinc, about 20 to about 80 at. % zinc, about 30 to about 70 at. % zinc, or about 40 to about 60 at. % zinc.

The lithium alloy layer further includes, consists essentially of, or consists of a diffusion composition that includes, consists essentially of, or consists of lithium and zinc, wherein the concentration of lithium and zinc change relative to the position within the alloy layer and thereby the anode. In one preferable instance, the diffusion composition of lithium and zinc includes a lithium concentration that decreases from adjacent to the lithium metal layer toward the brass interlayer and a zinc concentration that increases from adjacent to the lithium metal layer toward the brass interlayer. Accordingly, the lithium alloy layer can have average values for the lithium and the zinc concentrations and can have a linear, exponential, or step variation in concentrations relative to the position within the lithium alloy layer. In one example, the zinc concentration varies from about 1 at. % zinc adjacent to the lithium metal layer to about 99 at. % distal from the lithium metal layer and preferably adjacent to the zinc layer. In another example, the zinc concentration in the lithium alloy layer varies from about 1 at. % to about 99 at. %, 95 at. %, 90 at. %, 85 at. %, 80 at. %, 75 at. %, 70 at. %, 65 at. %, 60 at. %, 55 at. %, or 50 at. %. In another example, the lithium concentration varies from about 99 at. % lithium adjacent to the lithium metal layer to about 1 at. % distal from the lithium metal layer and preferably adjacent to the zinc layer. In another example, the lithium concentration in the lithium alloy layer varies from about 99 at. %, 95 at. %, 90 at. %, 85 at. %, 80 at. %, 75 at. %, 70 at. %, 65 at. %, 60 at. %, 55 at. %, or 50 at. % to about 1 at. %, 5 at. %, 10 at. %, 15 at. %, 20 at. %, or 25 at. % lithium. Notably, in instances wherein the lithium alloy layer is adjacent to the zinc layer the zinc concentration preferably increases to about 99 at. % zinc adjacent to the zinc layer, and wherein the lithium alloy layer is adjacent to a ternary interlayer the zinc concentration may not increase to greater than 95 at. % zinc adjacent to the ternary interlayer. Preferably, the lithium alloy layer is a solid solution of lithium and zinc. In another example, the diffusion composition of lithium and zinc includes a lithium-zinc intermetallic. In still another example, the diffusion composition of lithium and zinc includes a plurality of lithium-zinc intermetallics.

The lithium metal anode further includes a lithium metal layer carried on the lithium alloy layer. The lithium metal layer, preferably, includes greater than 90 at. %, 92 at. %, 94 at. %, 96 at. %, 98 at. %, 99 at. %, or 99.5 at. % lithium; more preferably, the lithium metal layer consists essentially of, or consists of lithium. Additionally, the lithium metal layer can have a thickness of about 0.1 μm to about 100 μm, about 0.1 μm to about 75 μm, about 0.1 μm to about 50 μm, about 0.1 μm to about 25 μm, about 0.1 μm to about 15 μm, about 0.1 μm to about 10 μm, about 0.1 μm to about 5 μm, or about 0.1 μm to about 2.5 μm. In preferable examples, the lithium metal layer has a thickness of about 1 μm, about 3 μm, about 5 μm, about 7 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, or about 100 μm.

Figure 4:
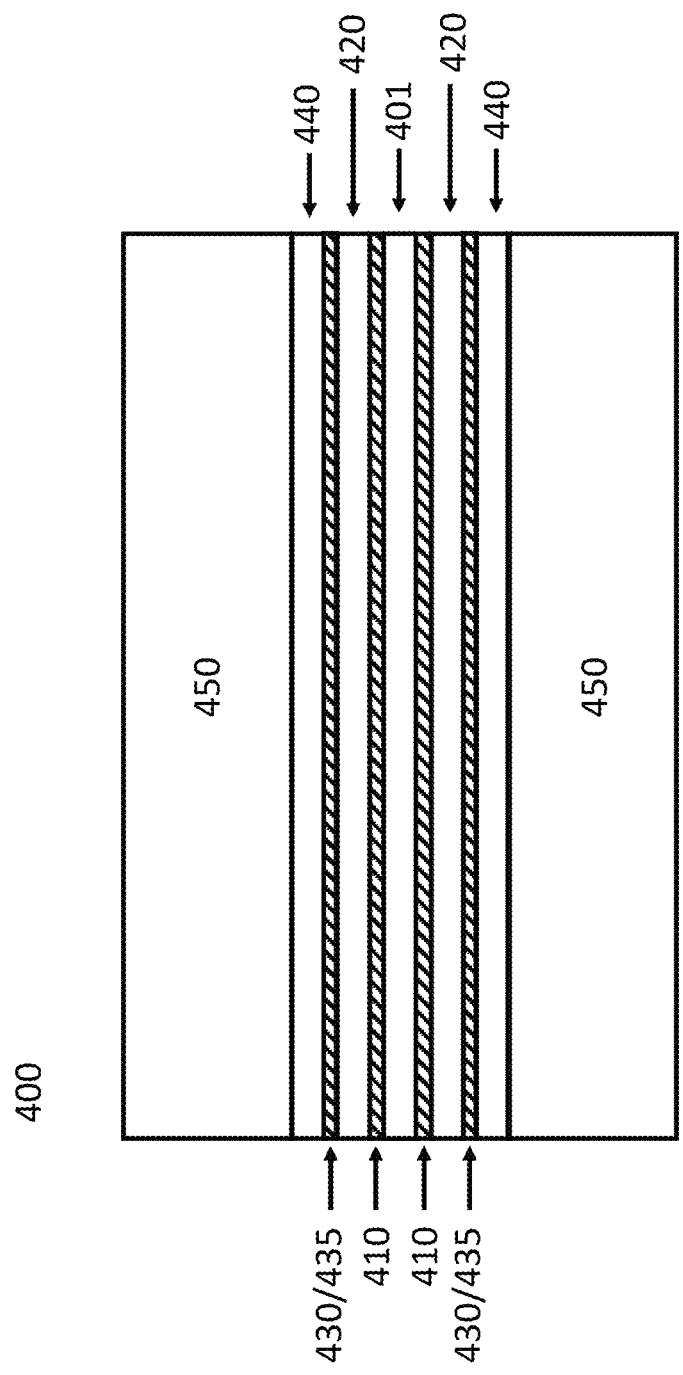
FIG. 4 is a second representation of an anode as described herein.

In another instance (e.g., as shown in FIG. 4), the lithium metal anode 400 can include a polymer core 401 that carries the copper current collector 410. The polymer core can have a thickness of about 3 μm to about 50 μm; about 3 μm to about 40 μm; about 3 μm to about 30 μm; or about 3 μm to about 25 μm; and the copper current collector carried on the polymer core can have a thickness of about 0.1 nm to about 1,000 nm, about 0.1 nm to about 500 nm, about 0.1 nm to about 250 nm, about 0.1 nm to about 200 nm, about 0.1 nm to about 150 nm, or about 0.1 nm to about 100 nm.

The polymer core can have a composition that includes a polyethylene, a polypropylene, a polyethylene terephthalate, a polyethylene naphthalate, a polyimide, a polyphenylene terephthalamide, a polyaniline, a polypyrrole, a polyacetylene, a polyindole, a polythiophene, a polyphenylene, a poly(p-phenylene vinylene), a polyvinylidene chloride, mixtures, or copolymers thereof.

Notably and herewith, any of the above-described electrodes and anodes can be double sided where the described structure is repeated, preferably to the same tolerances on a second or opposing side. In examples with the polymer core, the polymer core 401 can on a first side carry the described copper current collector 410 which carries the brass interlayer 420, lithium alloy layer 440, and lithium metal layer 450 and carries on an opposing side (a second side) the same structures. In another example, the anode 400 can include the polymer core 401 adhered to which is a copper current collector 410. The copper can then carry a brass interlayer 420 that optionally carries a zinc layer 430 or ternary alloy layer 435 on which can be carried a lithium alloy layer 440 and/or the lithium metal layer 450.

Figure 11:
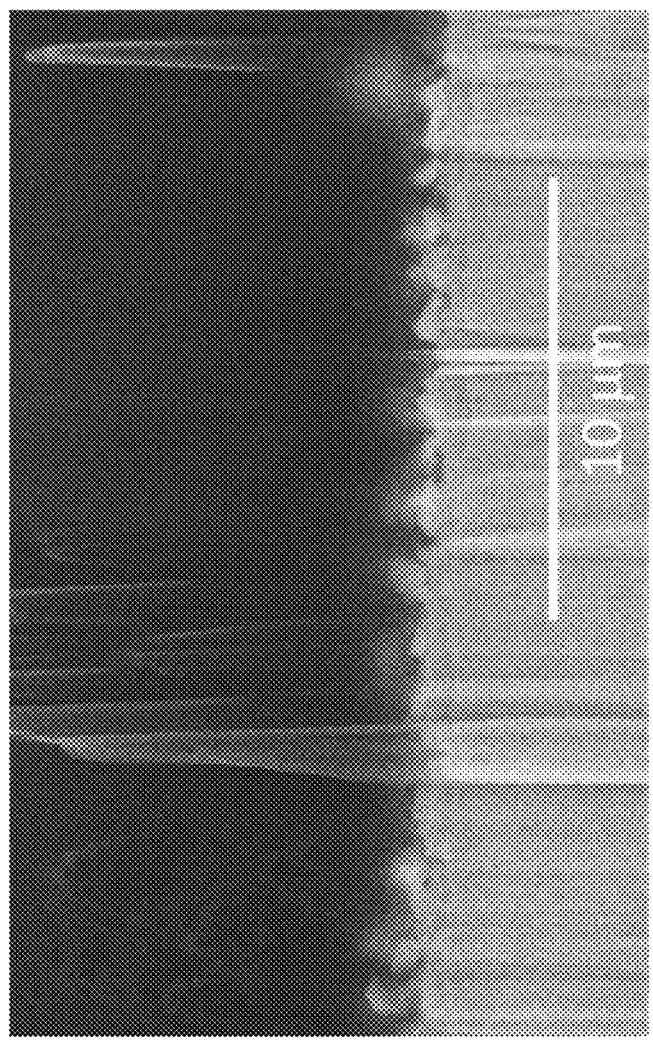
FIG. 11 is a cross-sectional SEM image of an anode as described herein.
Figure 12:
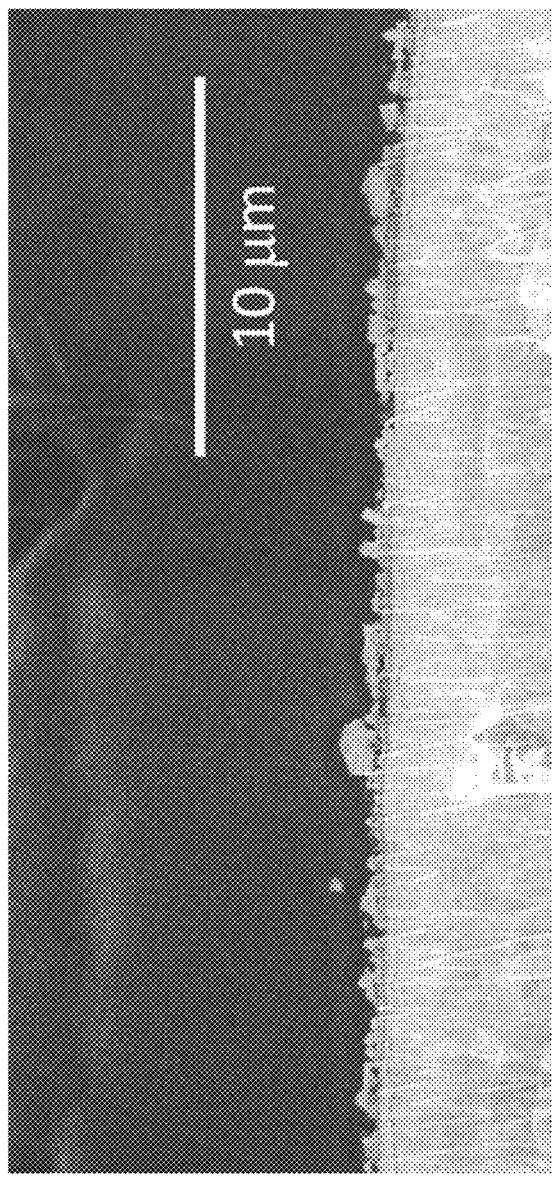
FIG. 12 is a second cross-sectional SEM image of an anode as described here.
Figure 13:
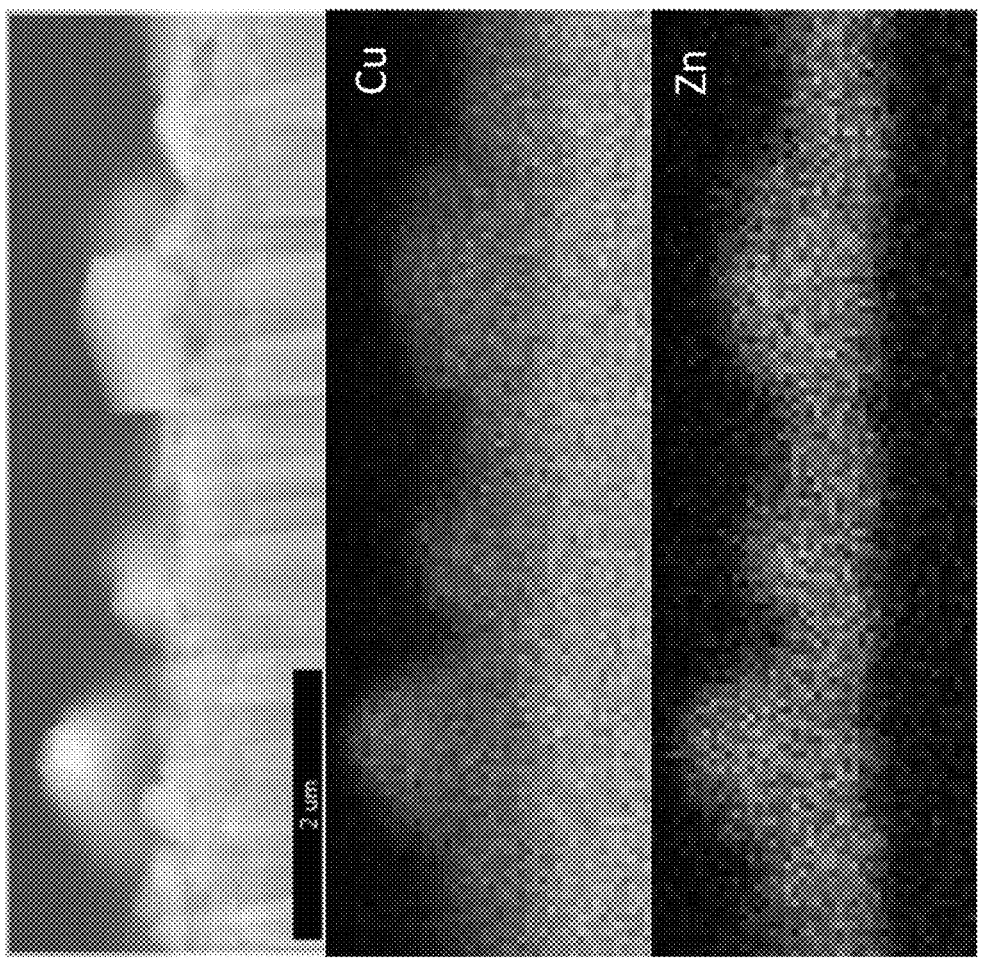
FIG. 13 is a second cross-sectional SEM image of the anode shown in FIG. 12 and the corresponding EDS results for copper and zinc.

Another embodiment, depicted in FIGS. 11-13, is a lithium metal anode that can include, consist essentially of, or consist of a copper current collector carrying and metallurgically affixed to a brass interlayer that includes zinc and copper; where the brass interlayer carries and is metallurgically affixed to a lithium metal layer. The brass interlayer has a thickness of about 1 nm to about 10 μm, about 5 nm to about 10 μm, about 10 nm to about 10 μm, about 10 nm to about 5 μm, or about 10 nm to about 2 μm. Herein, the brass interlayer preferably includes, consists essentially of, or consists of a ternary alloy of lithium, zinc, and copper. In one instance, the brass interlayer can include a diffusion composition of zinc and copper that has a zinc concentration that increases from adjacent to the copper current collector toward the lithium metal layer and a copper concentration that decreases from adjacent to the copper current collector toward the lithium metal layer. The brass interlayer preferably includes a zinc to copper ratio of about 1:4 to about 4:1, about 2:3 to about 3:2, or about 1:1.

In instances wherein the brass interlayer is free of lithium (e.g., wherein the brass interlayer is a binary alloy), the lithium metal anode can include a ternary interlayer disposed between the brass interlayer and the lithium layer, wherein the ternary interlayer includes lithium, copper, and zinc. In this instance, the ternary interlayer can have a thickness of about 5 nm to about 10 μm, about 5 nm to about 5 μm, or about 10 nm to about 2 μm.

The lithium metal anode can further include a lithium alloy layer disposed between the brass interlayer and the lithium metal layer, the lithium alloy layer includes lithium and zinc and is preferably a binary alloy of lithium and zinc.

Still further, the anode can include a zinc layer disposed between the brass interlayer and the lithium alloy layer; wherein the zinc layer is substantially free of copper and lithium.

The lithium metal layer of the lithium metal anode can have a thickness of about 1 µm to about 100 µm, preferably about 2.5 µm to about 100 µm; and includes greater than 90 at. % lithium. Notably and herewith, the thickness of the lithium metal layer(s) is per side of the lithium metal anode. Still further, the lithium metal anode can include a polymer core (as described above) that carries the copper current collector; the polymer core having a thickness of about 3 µm to about 50 µm.

Figure 14:
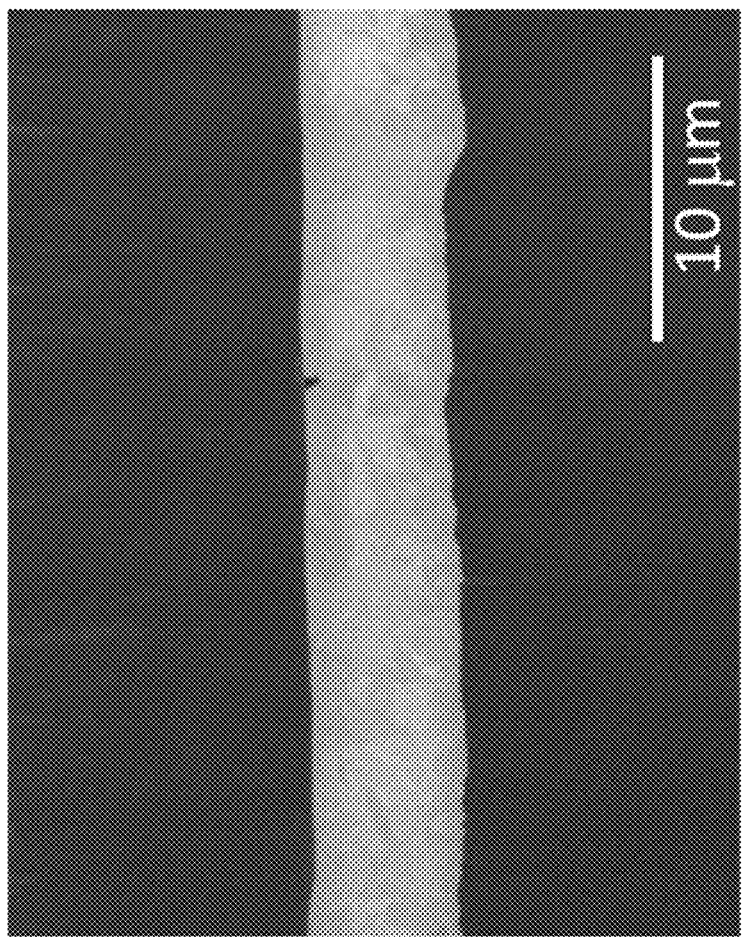
FIG. 14 is a cross-sectional SEM image of a comparable anode prepared without zinc.

In still another embodiment, the lithium metal anode can include, consist essentially of, or consist of a copper current collector physiochemically affixed to a lithium metal layer by a ternary interlayer, where the ternary interlayer includes a plurality of discontinuous particulates proximal to a surface of the copper current collector, a zinc to copper ratio of about 1:4 to about 4:1; and lithium. As seen in FIGS. 11-13, the interlayer (herein expressed as the ternary interlayer) between the copper current collector and the lithium metal layer can include a plurality of discontinuous particulates carried on the copper current collector. Plasma focused ion beam (pFIB) milling of the anode reveals the discontinuous particulates and many can be observed to have hexagonal crystal morphologies. Further investigation of the ternary interlayer can show a continuous coating layer adjacent to the surface of the copper current collector; wherein the discontinuous particulates are adjacent and adhered to the continuous coating layer. Notably, anodes prepared without zinc and therefore without the brass interlayer or the ternary interlayer do not include the discontinuous particles, as shown in FIG. 14.

Figure 5:
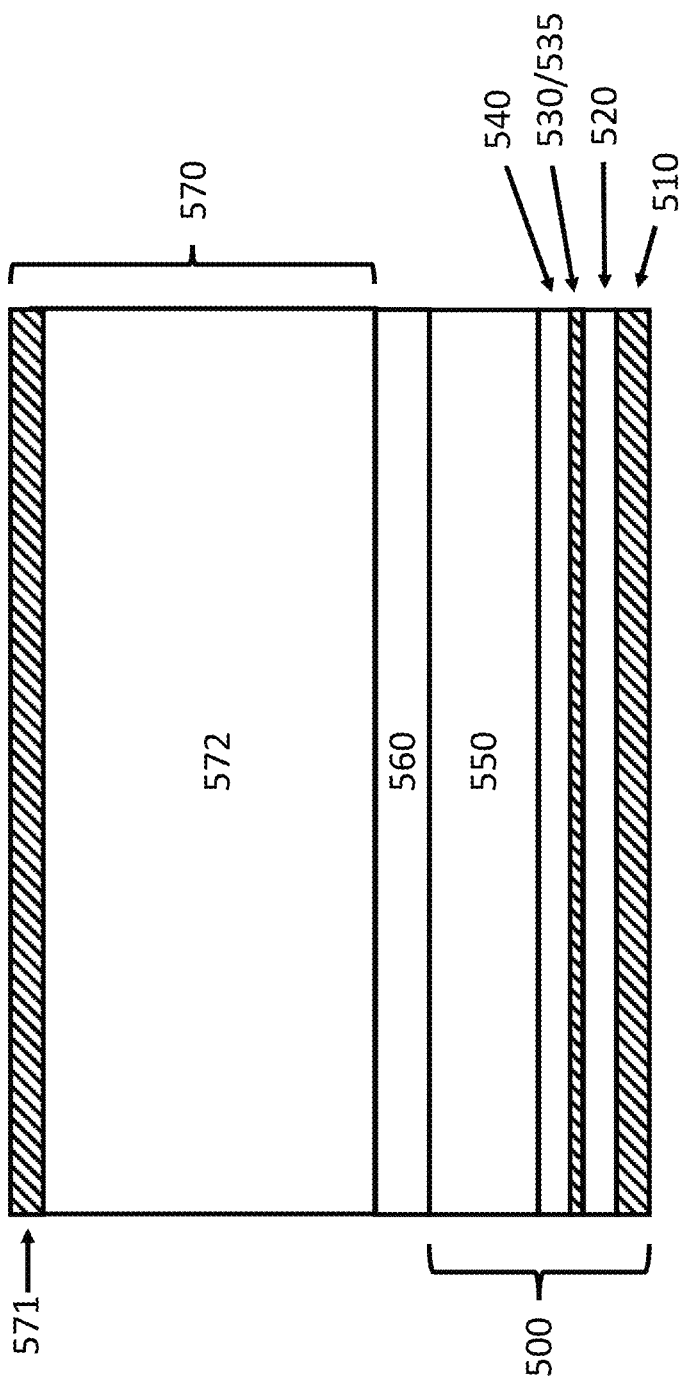
FIG. 5 is a representation of a cell utilizing the anode depicted in FIG. 3.

Still another embodiment is a cell (see FIG. 5) that includes a cathode 570, an electrolyte 560, and a lithium metal anode 500, as described above. The cathode preferably includes a current collector 571 carrying a cathodic composition 572; and the lithium metal anode 500 includes a copper current collector 510 carrying and metallurgically affixed to a brass interlayer 520 that can include a diffusion composition of zinc and copper; the brass interlayer 520 can carry a lithium alloy layer 540 that can include a diffusion composition of lithium and zinc; therein the lithium alloy layer 540 carries and is metallurgically affixed to a lithium metal layer 550. Preferably, the anode 500 includes the copper current collector 510 carrying and metallurgically affixed to the brass interlayer 520 which directly carries and is metallurgically affixed to the lithium metal layer 550, sans the zinc interlayer 530, and the lithium alloy layer 540. In a preferred instance, the lithium metal anode further includes a zinc layer disposed between the brass interlayer and the lithium alloy layer; wherein the zinc layer is substantially free of copper and lithium. In an alternative instance, the lithium metal anode 500 includes a ternary interlayer 535 disposed between the brass interlayer 520 and the lithium alloy layer 540, where the ternary interlayer includes lithium, copper, and zinc.

Yet still another embodiment is a process of preparing a foil; for example, preparing the above-described electrode or the above-described lithium metal anode. The process, preferably, includes providing a copper current collector; depositing zinc, preferably by a vapor deposition process, onto the copper current collector; forming a brass interlayer; depositing lithium, preferably by a vapor deposition process, adjacent to the zinc; and forming a lithium alloy layer. Notably, the formation of the brass interlayer may occur after the deposition of the lithium; for example, the brass layer may form by the influx of heat or residual heat associated with the thermal vapor deposition of lithium metal. Additionally, forming the lithium alloy layer can include heating the deposited lithium adjacent to the zinc to a temperature in a range of about 40° C. to about 180° C., about 45° C. to about 150° C., about 50° C. to about 125° C., about 50° C. to about 100° C., or about 65° C. to about 95° C.

Another embodiment is an electrode and/or anode that includes a low-zinc brass carrying a zinc layer. One example is a brass-zinc electrode that includes a low-zinc brass current collector carrying and metallurgically affixed to a zinc layer; the low-zinc brass current collector and zinc layered adhered by a high-zinc brass interlayer; the zinc layer carrying an electrode surface having a surface composition that is free of copper. Herewith, the low-zinc brass includes a zinc concentration that is less than 50 at. %, 40 at. %, 30 at. %, 20 at. %, 10 at. %, or 5 at. %. In a particular instance, the low-zinc brass is an admiralty brass. In another particular instance, the low-zinc brass is a gilding metal, an Abyssinian gold, a Nordic gold, or a red brass. The high-zinc brass includes a zinc concentration that is greater than about 50 at. %, 60 at. %, 70 at. %, 80 at. %, or 90 at. %; preferably, the high-zinc brass includes a zinc concentration of greater than 70 at. %, 75 at. %, or 80 at. %.

Examples

Products were prepared using standard GLP procedures for handling of the respective materials and admixtures. All commercial materials were used as received.

Electrodes were generally prepared by the vapor deposition of zinc onto 6 µm electrodeposited (ED) copper foil in a roll-to-roll process. The zinc thicknesses were varied from about 0.1 µm to about 0.5 µm zinc. Typically, magnetron sputtering in a high vacuum environment was employed for zinc transfer. Zinc was also deposited onto copper foil by an electrodeposition process (plating).

Anodes were generally prepared by the vapor deposition of lithium onto zinc coated 6 µm electrodeposited copper foil in a roll-to-roll process. The lithium thicknesses were varied from about 1 µm to about 20 µm lithium. Typically, evaporative lithium deposition in a high vacuum environment was employed for lithium transfer. Lithium was also deposited onto the zinc coated copper by an electrodeposition process (plating) in a half cell.

Some samples produced by the above-described methods includes:

| Example | Copper (µm) | Zinc (µm) | Process | Lithium (µm) | Process | See FIG. |
|---|---|---|---|---|---|---|
| 1 | 6 ED | 0 | | 5 | PVD | |
| 2 | 6 ED | 0 | | 20 | PVD | 14 |
| 3 | 6 ED | 0.1 | PVD | 0 | | |
| 4 | 6 ED | 0.2 | PVD | 0 | | 10 |
| 5 | 6 ED | 0.5 | PVD | 0 | | |
| 6 | 6 ED | 0.2 | PVD | 5 | ECD | 9 |
| 7 | 6 ED | 0.2 | PVD | 20 | ECD | 8 |
| 8 | 6 ED | 0.1 | PVD | 5 | PVD | |
| 9 | 6 ED | 0.2 | PVD | 5 | PVD | |
| 10 | 6 ED | 0.5 | PVD | 5 | PVD | |
| 11 | 6 ED | 0.1 | PVD | 20 | PVD | |
| 12 | 6 ED | 0.2 | PVD | 20 | PVD | |
| 13 | 6 ED | 0.5 | PVD | 20 | PVD | 6-7, 11-13 |

Coin cells were prepared from all samples and tested in cells against lithium metal, LFP, and NMC-811. Additionally, coin cells were prepared from commercially available lithium metal on copper foil having nominal thicknesses that are the same as the prepared examples.

Figure 6:
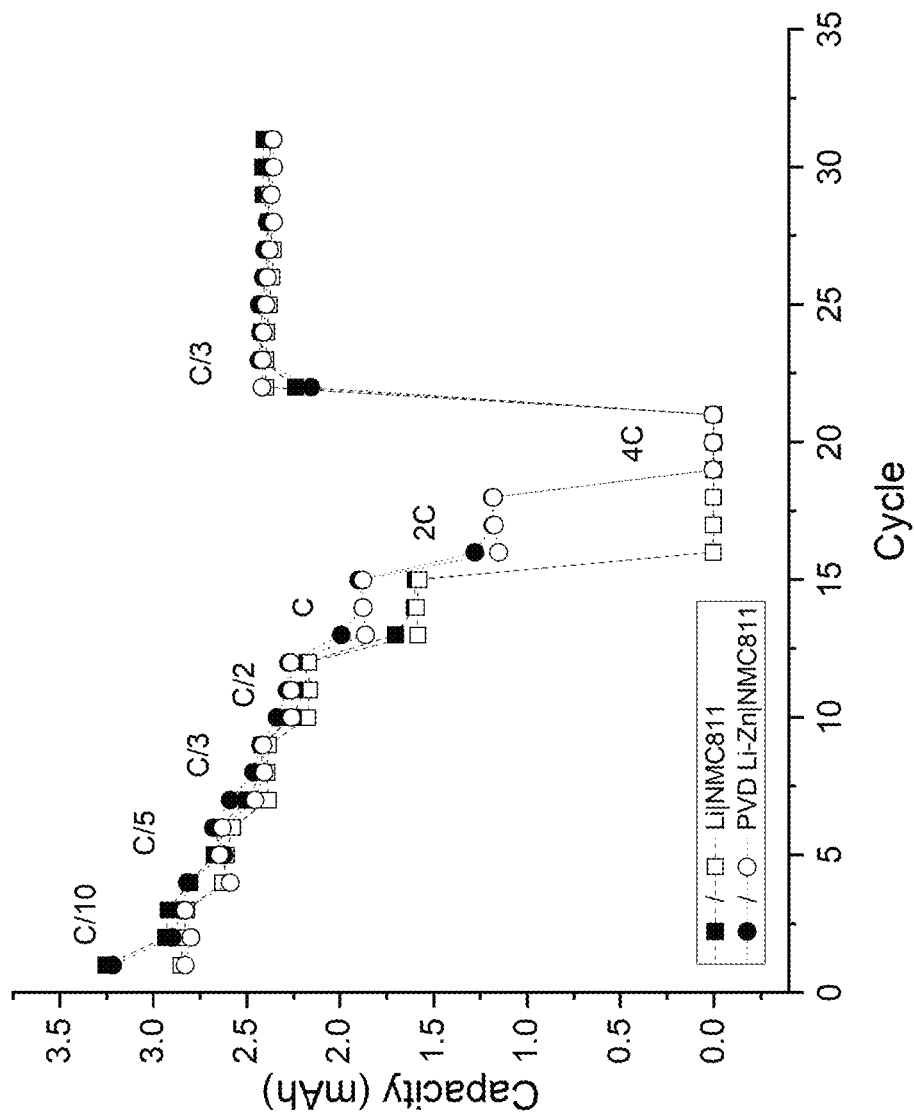
FIG. 6 is a plot of cell capacity at varying C-rates for a battery, utilizing vapor deposited 20 μm lithium, as described herein and a battery using a commercially available lithium metal anode.
Figure 7:
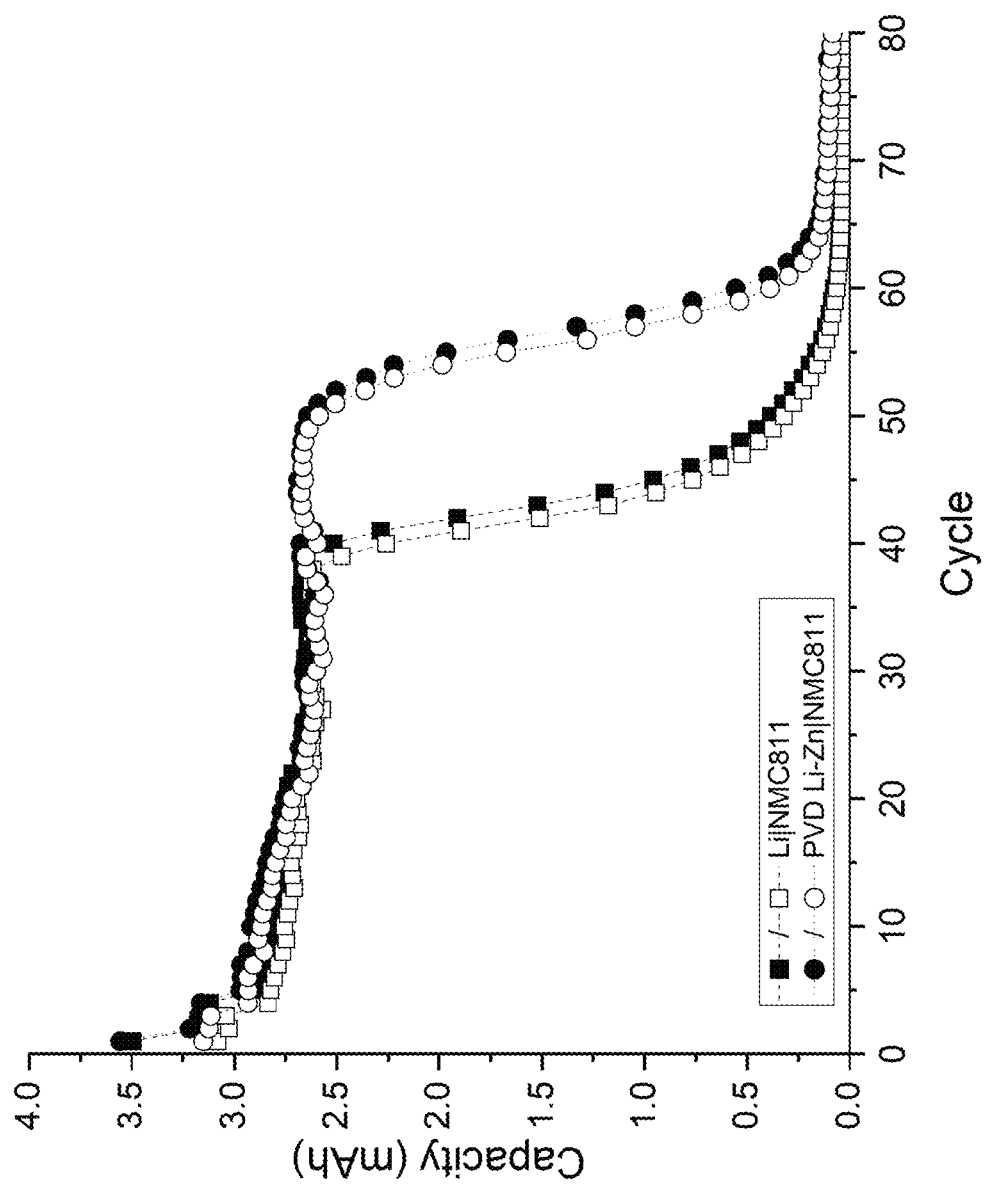
FIG. 7 is a plot of cell capacity at C/10 formation and C/3 cycling for a battery, utilizing vapor deposited 20 μm lithium, as described herein and a battery using a commercially available 20 μm lithium metal anode.

The full cell performance depicted in FIG. 6 demonstrates a superior high-rate charging/discharging capability using example 13. By comparison, having a commercial anode in a full cell performed poorly when the rate was over 1C. In addition, the cell with example 13 shows a full capacity recovery after ultrafast charging, indicating a well-maintained material structure under overloaded currents. FIG. 7 also shows that example 13 can deliver a proximately 30% longer cycling life than the commercial anode.

Figure 8:
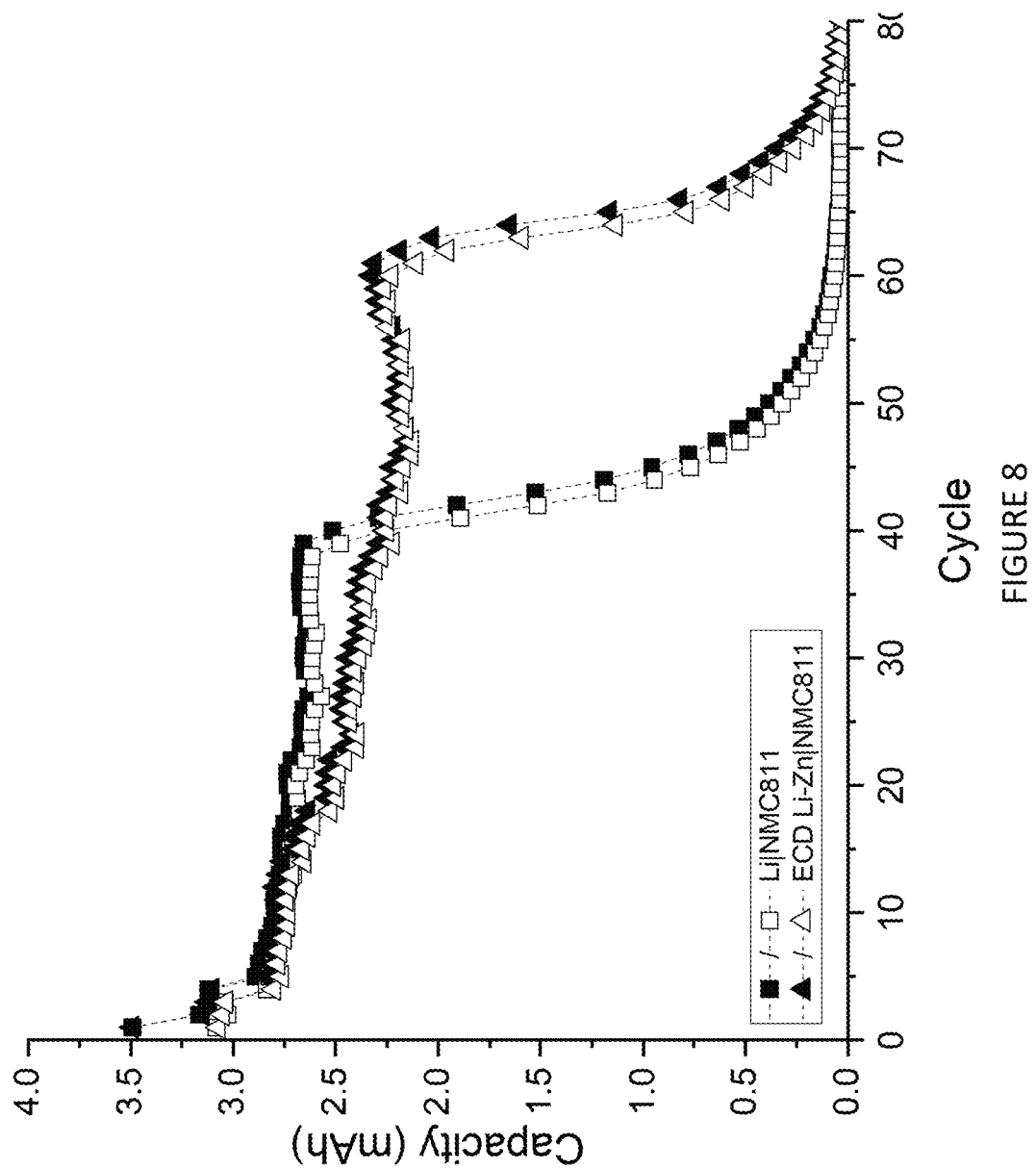
FIG. 8 is a plot of cell capacity at C/10 formation and C/3 cycling for a battery, utilizing electrodeposited 20 μm lithium, as described herein and a battery using a commercially available 20 μm lithium metal anode.
Figure 9:
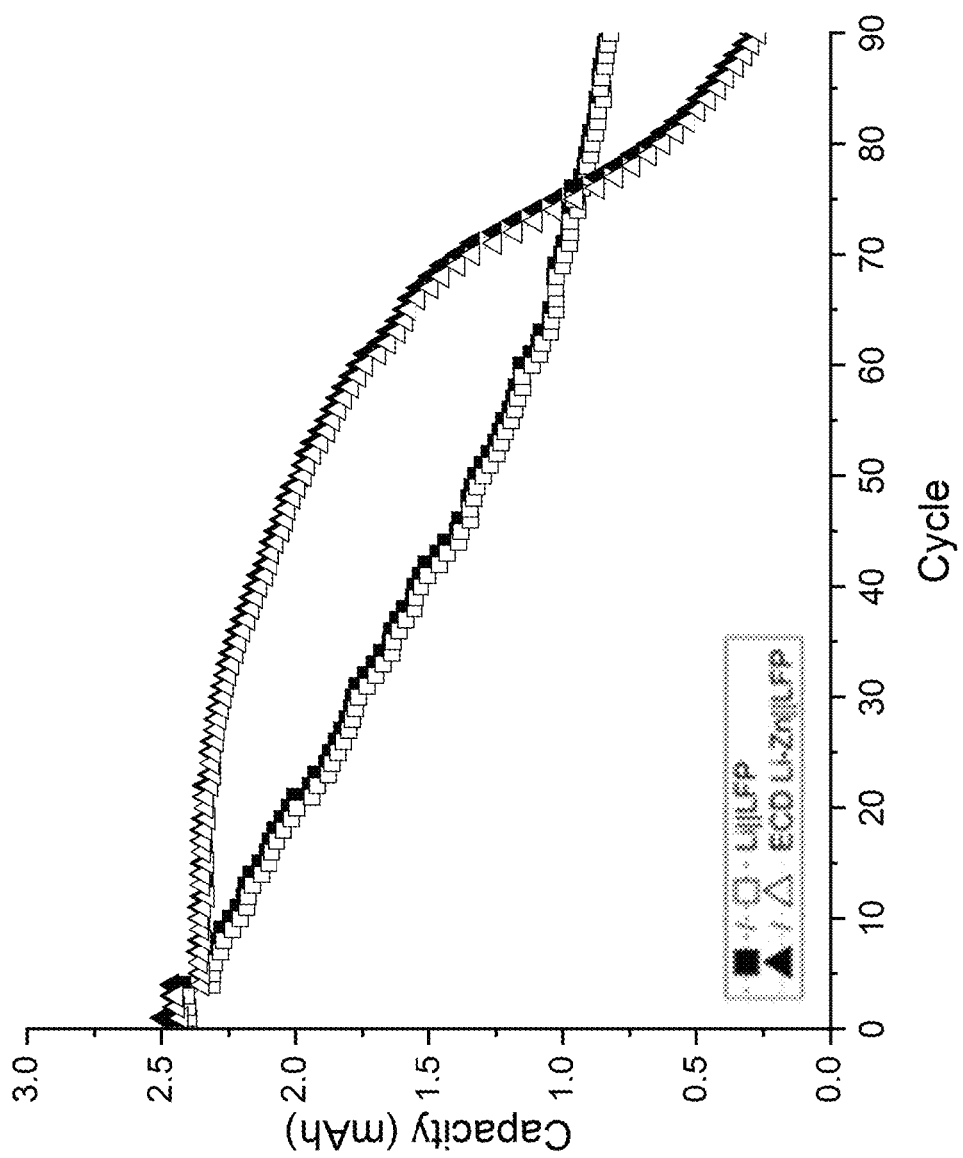
FIG. 9 is a plot of cell capacity at C/10 formation and C/3 cycling for a battery, utilizing electrodeposited 5 μm lithium, as described herein and a battery using a commercially available 5 μm lithium metal anode.

FIG. 8 and FIG. 9 display the performance of full cells using ECD-deposited 20 μm lithium (example 7) and 5 μm lithium (example 6) on Zn respectively. Both examples demonstrated better cycling life in full cells than the commercial anodes with nominal thicknesses.

Figure 10:
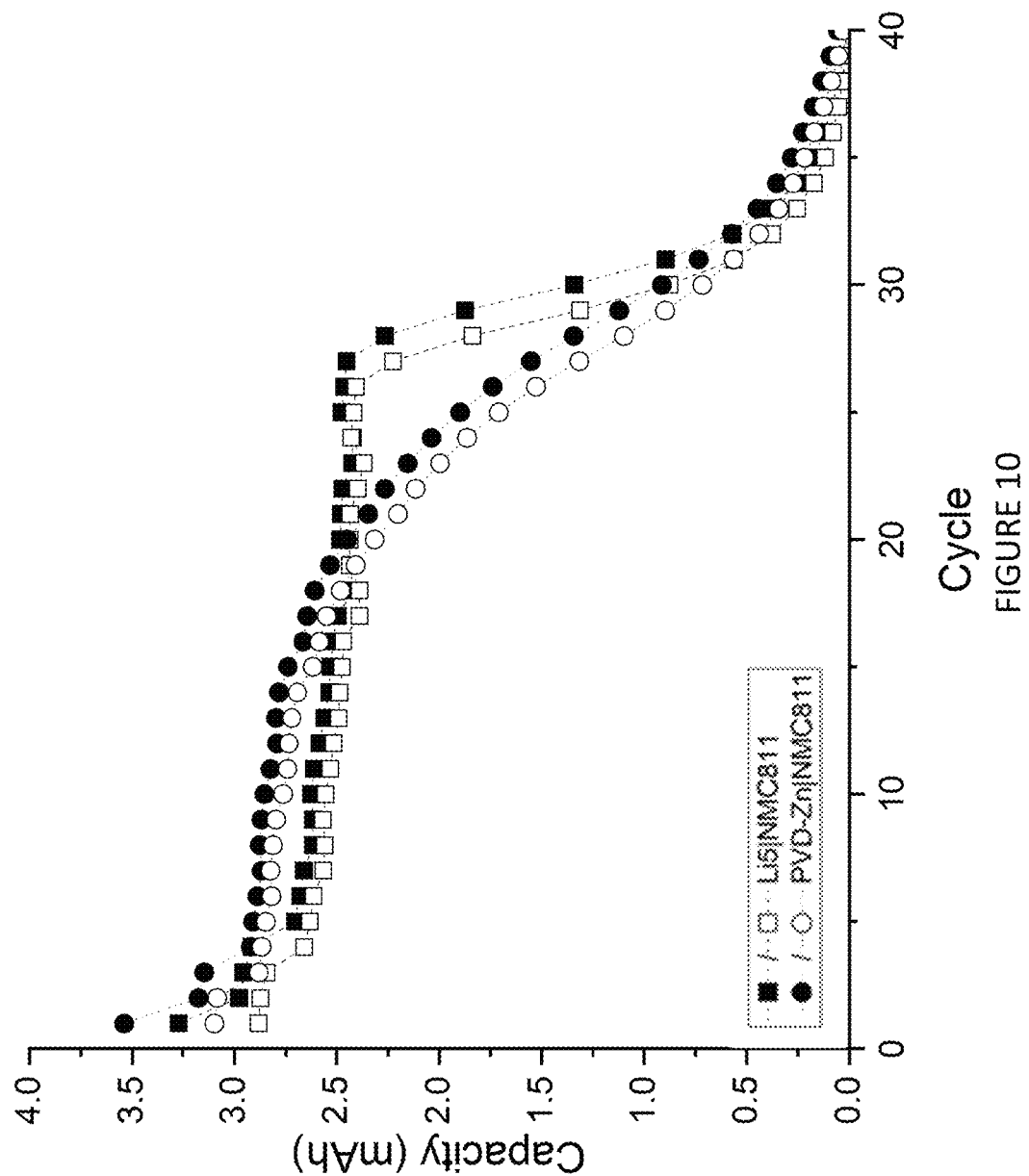
FIG. 10 is a plot of cell capacity at C/10 formation and C/3 cycling for a battery, utilizing anode-less material, as described herein and a battery using a commercially available 5 μm lithium metal anode.

The anodeless (0 μm lithium) cells were built using example 4. As depicted in FIG. 10, anodeless material was approved to function properly and presented a competitive cycling life in full cells comparing the commercial 5 μm lithium anode.

In addition to the cross-sectional SEM analysis by pFIB, example 10 and 13 were cross-sectioned and EDS line scans and mapping was completed on the exposed surfaces. FIG. 13 shows the SEM image with the corresponding copper and zinc EDS mapping. This analysis highlights the formation of a copper-zinc alloy between the copper current collector and the lithium metal layer. TOF-SIMS analysis of other cross-sections showed lithium in the interlayer.

While the compositions and methods of this invention have been described in terms of preferred embodiments, it will be apparent to those of skill in the art that variations may be applied to the compositions and/or methods in the steps or in the sequence of steps of the method described herein without departing from the concept, spirit, and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A lithium metal anode comprising:
   a copper current collector carrying and metallurgically affixed to a brass interlayer that includes zinc and copper; and
   a ternary interlayer disposed between the brass interlayer and a lithium metal layer, wherein the brass interlayer is free of lithium and the ternary interlayer includes lithium, copper, and zinc,
   wherein the brass interlayer includes a zinc to copper ratio of about 1:4 to about 4:1;
   wherein the brass interlayer includes a diffusion composition of zinc and copper that has a zinc concentration that increases from adjacent to the copper current collector toward the lithium metal layer and a copper concentration that decreases from adjacent to the copper current collector toward the lithium metal layer; and
   wherein the ternary interlayer has a thickness of about 10 nm to about 2 μm.

2. The lithium metal anode of claim 1, wherein the brass interlayer has a thickness of about 10 nm to about 2 μm.

3. The lithium metal anode of claim 1, wherein the zinc to copper ratio is about 2:3 to about 3:2.

4. The lithium metal anode of claim 3, wherein the zinc to copper ratio is about 1:1.

5. The lithium metal anode of claim 1, wherein the lithium metal layer has a thickness of about 2.5 μm to about 100 μm.

* * * * *